United States Patent [19]

Newman

[11] 3,993,832

[45] Nov. 23, 1976

[54] PRESSURE-SENSITIVE TRANSFER ELEMENT AND PROCESS

[75] Inventor: Douglas A. Newman, Glen Cove, N.Y.

[73] Assignee: Columbia Ribbon and Carbon Manufacturing Co., Inc., Glen Cove, N.Y.

[22] Filed: Oct. 31, 1975

[21] Appl. No.: 627,619

[52] U.S. Cl. .................. 428/307; 427/146; 427/149; 428/914

[51] Int. Cl.[2] .................. B32B 3/26; B32B 5/18

[58] Field of Search ............ 428/307, 914; 427/146, 427/149

[56] References Cited

UNITED STATES PATENTS

| | | | |
|---|---|---|---|
| 3,037,879 | 6/1962 | Newman et al. | 428/307 |
| 3,658,567 | 4/1972 | Newman et al. | 427/146 |
| 3,689,301 | 9/1972 | Scott | 428/307 |

*Primary Examiner*—William J. Van Balen

*Attorney, Agent, or Firm*—Thomas L. Tully

[57] ABSTRACT

Process of producing novel reusable pressure-sensitive transfer elements comprising a microporous resinous network of synthetic thermoplastic resin having formed therein a pressure-exudable fluid ink containing a polymerizable resin-forming material. The resin-forming material is stable within the transfer element under ambient conditions but is capable of being exuded to a copy sheet, as an ingredient of said ink, to form images which can be cured by subjecting them to polymerization conditions.

10 Claims, No Drawings

PRESSURE-SENSITIVE TRANSFER ELEMENT AND PROCESS

Reusable pressure-sensitive transfer elements having a microporous resinous network containing pressure-exudable ink are well known in the art and reference is made to U.S. Pat. Nos. 3,037,879 and 3,689,301, the disclosures of which are hereby incorporated by reference.

Transfer elements of this type, both in sheet and ribbon form, have met with widespread commercial success because of their cleanliness, reusability and quality copy characteristics. Among the advantages over conventional frangible transfer compositions and carbon papers based thereon is the fact that reusable transfer layers exude an oil-and-colorant ink which is absorbed by the copy paper so that the formed images are difficult to remove by conventional image lift-off tapes and/or heating devices which use such tapes. Thus the images are relatively permanent and difficult to remove, which is advantageous in the case of stock certificates, bonds, payroll checks, records and other valuable papers.

In this connection, however, it has been found that exudable inks based upon pigments produce images which can be altered by picking-off the solid pigment particles while exudable inks based upon soluble dye colorants tend to fade and also can be deleted by application of chemicals which react with the dye to render it colorless.

It is the principal object of the present invention to overcome these failings of conventional reusable transfer elements as relates to their use for the production of fraudproof images.

It is another object of the present invention to provide reusable transfer elements which are capable of forming images which can be altered, such as for correction purposes, but can be aftertreated to render them resistant to alteration.

It is yet another object of this invention to provide a reusable transfer element containing a fluid polymerizable ink within a network which insulates the ink sufficiently against heat and light that premature polymerization in situ is prevented.

It is an advantage of the present invention that the instant transfer elements can be rendered insensitive to imaging pressure in preselected areas by subjecting such areas to polymerization conditions.

These and other objects and advantages of the present invention will be apparent to those skilled in the art in the light of the present disclosure.

The present invention is based upon the discovery that conventional fluid polymerizable inks, comprising a non-volatile vehicle, can be formed in situ as pressure-exudable fluid inks within a microporous resinous network with which said vehicle is substantially incompatible, and remain stable within said network against premature polymerization under ambient conditions.

Polymerizable inks are generally regarded as unstable under ambient conditions and are stored under cool conditions in airtight containers which also exclude light. When the ink is removed from the containers, it must be used within a short time because polymerization begins to proceed under the effects of ambient heat, sunlight and/or the infrared radiation or ultraviolet radiation present therein, causing the ink to thicken and eventually harden.

According to the present invention, such polymerizable inks are provided in conventient, stable form as fluid inclusions within a microporous resinous network which retains the ink inclusions therewithin by capillary attraction and insulates the ink against sufficient air, heat and/or light as can cause premature polymerization. Even during use, any of the fluid ink which is exuded to the exposed surface of the ink layer is reabsorbed within the porous resin network by capillary attraction before premature polymerization can occur. At the same time, the amount of the fluid ink which transfers to the copy sheet remains exposed thereon and can be easily polymerized substantially instantaneously by subjecting it to strong polymerization conditions such as heat and/or light or at a slower rate under exposure to ambient conditions.

Suitable resinous network systems for use according to the present invention include those of aforementioned U.S. Pat. Nos. 3,037,879 and 3,689,301. Such systems include the resinous binder material, non-volatile liquid which is substantially incompatible with the binder material, and coloring matter, the latter two materials combining to form liquid ink inclusions within the binder material and leaving the resin in the form of a microporous network containing the ink within the pores thereof.

The non-volatile liquid which comprises the ink vehicle may be any of the incompatible oils listed in the aforementioned patents, in which case the polymerizable resin-forming material is present as a liquid which preferably is miscible therewith or as a solid which is dissolved therein. Alternatively the polymerizable resin-forming material may be the non-volatile liquid which is the ink vehicle, i.e. in cases where the resin-forming material is a non-volatile oily liquid which is substantially incompatible with the synthetic thermoplastic resin binder.

Such resinous network systems comprise a vinyl resin binder material and are applied from volatile organic solvent systems. However water-soluble or water-dispersible binders are also suitable.

According to the present invention, the ink vehicle which is incompatible with the resin binder material to form the pressure-exudable ink containing the coloring matter comprises or consists of a liquid material which is curable or polymerizable under the effects of applied heat or ultraviolet radiation to form a solid, permanent deposit. For instance, the ink vehicle may comprise any of the known monomers or prepolymers which are polymerizable under the effects of applied ultraviolet radiation, such as pentaerithritol acrylates, conventionally used in known u.v.-curable printing inks. Also, heat-polymerizable monomers or prepolymers such as trimethylol propane triacrylate are suitable provided that the monomer or prepolymer is one which is stable at the temperature used to dry the microporous ink layer. In both cases it is conventional to include a small amount of a polymerization inhibitor such as pyrogallol to prevent polymerization under ambient conditions, as well as a polymerization initiator or catalyst such as 9,10-anthraquinone, lauroyl peroxide, or the like, to assist the polymerization reaction under conditions of applied radiation rich in ultraviolet or rich in infrared or other heating means.

The following example is given as illustrative and should not be considered limitative.

| Ingredients | Parts by Weight |
|---|---|
| Vinyl chloride-vinyl acetate copolymer (Vinylite VYHH) | 10 |
| Dynacure GA-70 ink | 25 |
| Methyl ethyl ketone | 40 |
| Toluol | 20 |

The Vinylite VYHH resin binder is dissolved in the mixture of solvents and the Dynacure ink is added to the solution and uniformly mixed therein. Dynacure GA-70 ink is a commerially-available liquid printing ink which is stable under ambient conditions and which is curable and solidifiable by exposure to a light source rich in ultraviolet radiation. Such ink comprises pentaerithritol triacrylate monomer and pigment.

The composition is coated onto a flexible foundation film of 0.5 mil polypropylene which has been provided with a 0.2 mil bonding layer of polyurethane resin, and the volatile solvents are evaporated to form a dry microporous layer of the Vinylite VYHH resin containing the Dynacure ink within the pores thereof in the form of a liquid ink which is substantially incompatible with the Vinylite VYHH resin binder and is exudable therefrom to a copy sheet under the effects of imaging pressure such as typing pressure.

The images formed on a copy sheet by means of the transfer elements of the present invention are capable of being cured to render them permanent by exposing them to polymerization conditions, i.e. to a light source rich in ultraviolet radiation in the case of the ink of the foregoing example. For instance, a Dynacure DCM curing machine, commercially-available for this purpose, may be used as an ultraviolet light source for the polymerization of ultraviolet light-curable images according to the present invention. This is accomplished by exposing the imaged copy sheet to the light source for a period of a few seconds. The cured images become permanently bonded to the copy paper because the liquid ink penetrates the paper fibers at the surface of the copy sheet so as to become integrated therewith when solidified during the curing step. The cured images cannot be erased or picked off the copy sheet without removing the paper fibers integrated therewith and providing evidence of removal. Thus there remains evidence of alteration as a preventative against the fraudulent modification of checks, stocks, bonds and other valuable documents.

The transfer elements of the present invention generally are sheets or ribbons having a flexible foundation. However they may be in the form of self-supporting microporous ink layers or rolls capable of exuding the polymerizable ink.

Variations and modifications may be made within the scope of the claims and portions of the improvements may be used without others.

I claim:

1. A pressure-sensitive transfer element comprising a microporous network of synthetic thermoplastic resin containing within the pores thereof a pressure-exudable fluid ink comprising a polymerizable resin-forming binder material and coloring matter, said ink being pressure-transferable to a copy sheet in the form of a fluid ink capable of being polymerized and solidified by subjecting it to polymerization conditions.

2. A transfer element according to claim 1 in which the polymerizable resin-forming binder material of the ink comprises a material capable of being polymerized by exposure to a light source rich in ultraviolet radiation.

3. A transfer element according to claim 2 in which the resin-forming binder material comprises a pentaerithritol acrylate monomer.

4. A transfer element according to claim 1 in which the synthetic thermoplastic resin comprises a vinyl resin.

5. A transfer element according to claim 1 in which said microporous network is in the form of a thin layer supported by a flexible foundation to provide a pressure-sensitive image-forming transfer element.

6. Process for producing a transfer element containing a fluid ink capable of being solidified by exposure to polymerization conditions, comprising providing a composition by uniformly mixing a synthetic thermoplastic resin binder material, a fluid material which is substantially incompatible with said binder material and which comprises a polymerizable resin-forming material, coloring matter and a volatile vehicle for said binder material, and evaporating said volatile vehicle to form a microporous network of said synthetic thermoplastic resin containing within the pores thereof said fluid material and coloring matter in the form of a pressure-exudable fluid ink capable of being transferred to a copy sheet and solidified thereon by exposure to conditions which cause said resin-forming material to polymerize.

7. Process according to claim 6 in which said composition is applied as a thin coating to a flexible foundation sheet and said volatile vehicle is evaporated to form a pressure-sensitive, image-forming transfer sheet.

8. Process according to claim 6 in which said resin-forming material comprises a fluid material capable of being polymerized by exposure to a light source rich in ultraviolet radiation.

9. Process according to claim 8 in which said fluid material comprises a pentaerithritol acrylate monomer.

10. Process according to claim 6 in which said resin binder material comprises a vinyl resin.

* * * * *